United States Patent
Jennrich et al.

(10) Patent No.: US 7,183,363 B2
(45) Date of Patent: Feb. 27, 2007

(54) THERMALLY CONDUCTIVE CASTING COMPOUND

(75) Inventors: Irene Jennrich, Winnenden (DE); Kristian Leo, Burgstetten (DE); Markus Muzic, Murr (DE); Wolfgang Endres, Remshalden (DE)

(73) Assignee: Robert Bosch GmbH, Stuttgurt (DE)

( * ) Notice: Subject to any disclaimer, the term of this patent is extended or adjusted under 35 U.S.C. 154(b) by 0 days.

(21) Appl. No.: 10/416,965

(22) PCT Filed: Nov. 14, 2001

(86) PCT No.: PCT/DE01/04268

§ 371 (c)(1),
(2), (4) Date: Dec. 2, 2003

(87) PCT Pub. No.: WO02/40589

PCT Pub. Date: May 23, 2002

(65) Prior Publication Data

US 2004/0092654 A1    May 13, 2004

(30) Foreign Application Priority Data

Nov. 16, 2000 (DE) ................................ 100 57 111

(51) Int. Cl.
*C08L 63/00* (2006.01)
(52) U.S. Cl. ...................... 525/476; 428/413; 428/447; 522/7; 522/31; 522/67; 522/77; 522/170; 523/457; 524/424; 524/588
(58) Field of Classification Search ................ 523/440; 525/476; 524/266, 268
See application file for complete search history.

(56) References Cited

U.S. PATENT DOCUMENTS

| 4,826,896 | A | * | 5/1989 | Procter ........................ 523/443 |
| 5,248,710 | A | | 9/1993 | Shiobara et al. |
| 5,319,005 | A | * | 6/1994 | Hagiwara et al. ........... 523/435 |
| 5,497,033 | A | | 3/1996 | Fillion et al. |
| 5,883,160 | A | * | 3/1999 | Kikuchi et al. .............. 523/451 |
| 5,965,637 | A | | 10/1999 | Pfander et al. |
| 6,037,043 | A | | 3/2000 | Lehner et al. |
| 6,129,955 | A | * | 10/2000 | Papathomas et al. ........ 427/517 |
| 6,169,142 | B1 | * | 1/2001 | Nakano et al. .............. 524/862 |
| 6,239,245 | B1 | * | 5/2001 | Morita et al. .................. 528/15 |
| 6,323,263 | B1 | * | 11/2001 | Kuwabawa et al. ......... 523/443 |

FOREIGN PATENT DOCUMENTS

DE    41 38 411    5/1993

OTHER PUBLICATIONS

"Handbook of Fillers, 2nd Edition"(Chapter 5- Physical Properties of Fillers and Filled Materials), Wypych, 2000 Chem Tec Publishing.*
Mesh- Micron Conversion Tables www.racetingmachines.com/gritmesh-micron/shmt/ www.fluideng.com/FE/meshmicron.html.*

* cited by examiner

*Primary Examiner*—Marc S. Zimmer
(74) *Attorney, Agent, or Firm*—Kenyon & Kenyon LLP

(57) ABSTRACT

A resin-based casting compound which cures by a chemical reaction is described; it is suitable in particular for insulation of electric components and it contains an epoxy resin component (A), a silicone-containing component (B), a filler (C), by the choice of which the thermal conductivity of the casting compound is adjustable, and a thermal initiator (D). The casting compound has a thermal conductivity of $\geq 2$ W/mK.

12 Claims, No Drawings

THERMALLY CONDUCTIVE CASTING COMPOUND

FIELD OF THE INVENTION

The present invention relates to a casting compound and use thereof.

BACKGROUND INFORMATION

Resin-based casting compounds that cure by a chemical reaction play a major role in the production of industrial components and assemblies. They are used for insulation purposes in electric and electronic components, among other things. If such a component heats up during operation, adequate dissipation of heat must be ensured. If heat is generated directly in the printed conductors of the component, casting compounds having a high thermal stability and a high thermal conductivity are desirable for use for insulation or mechanical fixation.

German Patent No. 41 38 411 describes curable casting compounds which are used for mechanical fixation and dissipation of heat for windings of water-cooled generators. However, the casting compounds described there are two-component systems having a thermal conductivity of 0.8 to 1.8 W/mK.

In two-component systems, one component is an activator, which is mixed with the other component, which contains reactive resins, fillers, etc., and the mixture is processed immediately. This is a disadvantage, because preparation of the casting compound must be integrated into the processing operation, and it is impossible to store the ready-to-use mixture for three to twelve months at room temperature, for example. Another disadvantage is that it is technically very difficult to ensure the occupational safety in handling the activating component, because the compounds used as activators, e.g., anhydrides of carboxylic acids or amines, are often irritants or represent a health hazard. For this reason, there is interest in the development of casting compounds in the form of single-component systems which are storable for long periods of time in the premixed form.

The object of the present invention is to provide a casting compound which is stable in storage and is directly processable as a single-component system, having good flow properties during processing and a high thermal stability and thermal conductivity.

SUMMARY OF THE INVENTION

An object of the present invention is achieved according to the present invention by providing a casting compound which is processable as a single-component system and has a thermal conductivity of ≧2.0 W/mK through the choice of the filler. This casting compound is characterized by a low viscosity and a good capillary action during processing and, when cured, it has such a high thermal conductivity that it is suitable for dissipation of heat during operation of electric and/or electronic components. Moreover, when the casting compound is cured, it is resistant to cracking and has a high thermal stability.

The casting compound thus has a short curing time and an advantageous reaction profile, and consequently it is easily processable. This is due to the choice of a suitable initiator, which includes a cationic cross-linking agent and a co-catalyst.

In another especially advantageous embodiment, the casting compound contains up to 95 wt % of a filler, which contains a mixture of material components having a defined particle size distribution. This ensures a particularly high thermal conductivity of the casting compound without an unwanted increase in the viscosity of the casting compound during processing.

DETAILED DESCRIPTION

Casting compounds according to the present invention have four basic components, namely an epoxy resin component A, a silicone-containing component B, a filler C and an initiator D. In addition, other components which are conventionally used in generic casting compounds are also provided, e.g., foam suppressants, sedimentation inhibitors and adhesion promoters; those skilled in the art are familiar with the use of these components.

In general, the casting compounds must form a stable system before and during processing to prevent the components from separating. The filler particles should thus form a stable dispersion with the epoxy resin components, and the epoxy resin components should in turn form stable emulsions with one another. This stability must be ensured during processing and curing of the casting compounds.

Essentially a variety of monomeric or oligomeric compounds having at least two epoxy functions may be used as epoxy resin component A, either alone or in mixture with other compounds with or without an epoxy function. However, it is particularly advantageous to use di-, tri- or tetraepoxides; the commercially available compounds shown below are given as examples:

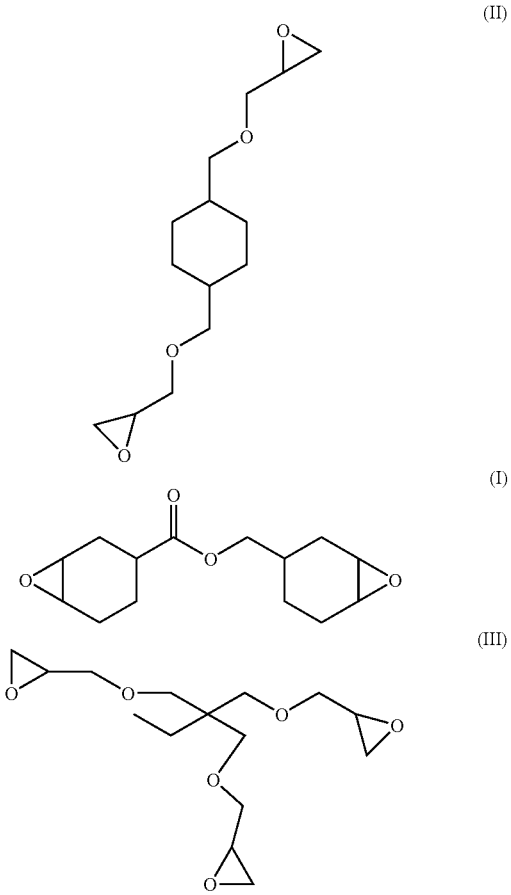

-continued

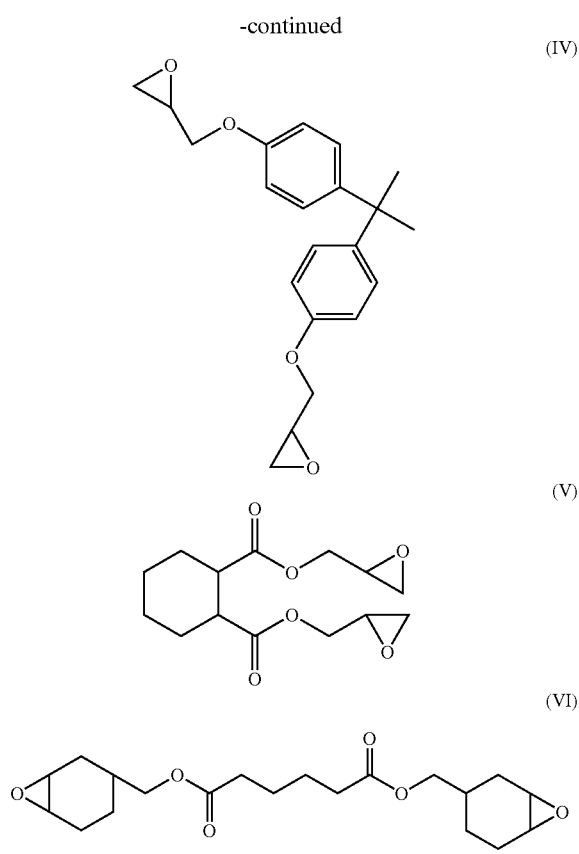

(IV)

(V)

(VI)

Epoxy resin component A may include one or more of compounds (I) through (VI) as well as other components. Ring-epoxidized cycloaliphatic diepoxides such as (I) and (VI) have proven particularly suitable. Epoxy resin component A is present in the casting compound in the amount of 4 wt % to 25 wt %, preferably 15 wt % to 20 wt %.

Component B, which is also contained in the casting compound, is a dispersion or emulsion of one or more silicones in an epoxy resin. The silicones include silicone oils, silicone block copolymers or silicone particles. Silicone particles in the form of silicone resin particles or silicone elastomer particles having a particle diameter of 10 nm to 100 μm are preferably used. The silicone particles may essentially have a chemically modified surface in the form of a polymer layer of PMMA, for example (known as core-shell particles); however, it has been found that untreated and/or surface-functionalized silicone particles are more suitable for the object of the present invention. Essentially all compounds having at least two epoxy functions may be used as the epoxy resin, either alone or in mixture with other compounds with or without an epoxy function. However, it is particularly advantageous to use one or more of the diepoxides (I) through (VI) mentioned above. Silicone-containing component B contains up to 10 wt % to 80 wt % silicone, preferably 40 wt %. The casting compound contains 0.5 wt % to 25 wt % silicone-containing component B.

The casting compound also contains one or more fillers C, which, properly selected, adjust the thermal conductivity of the casting compound in the fully cured state, their particle size distribution and the percentage amount in the casting compound and which are also able to prevent shrinkage of the casting compound during processing. Suitable filler C compounds include mainly silicon carbide and oxides of the main group elements, such as aluminum oxide or powdered quartz, either individually or in mixture. It has been found to be particularly suitable to use a mixture of silicon carbide and aluminum oxide; the particle size of the filler particles used plays an important role here. Casting compounds containing silicon carbide having a particle size distribution $d_{50}$ between 10 μm and 600 μm and aluminum oxide having a particle size distribution $d_{50}$ of 0.1 μm to 50 μm or 0.1 μm to 10 μm have the desired thermal conductivity and cracking resistance in a particularly pronounced manner. It is also advantageous to use aluminum oxide having two or more different particle size distributions. The thermal conductivity of aluminum oxide as such is 28 W/mK, that of silicon carbide is 110 to 126 W/mK, and that of powdered quartz is approx. 3.5 W/mK. Filler C is present in the casting compound in the amount of 60 wt % to 95 wt %, preferably 80 wt % to 90 wt %.

The casting compound contains as fourth component D an initiator which permits a sufficiently rapid reaction at an elevated temperature. The initiators may be thermal initiators and/or photoinitiators. To ensure that the casting compound is processable as a single-component system, a cationic cross-linking agent was selected as the initiator. It may be, e.g., a quinolinium, sulfonium, iodonium or boro-iodonium compound, which will result in cationic polymerization of the epoxy resin. The initiator may also contain a co-catalyst, which is used in particular to lower the starting temperature of the reaction. It may be a free radical-forming agent such as benzopinacol. The choice of the initiator determines the course of the curing reaction to a significant extent. Combining a cationic cross-linking agent with a co-catalyst results in a suitable reaction rate profile, which is characterized by an optimum reaction temperature, which is to be narrowly delimited at which the reaction proceeds promptly without a sluggish reaction occurring at lower temperatures such as room temperature, for example. This is also a prerequisite for the single-component system to be storable at room temperature.

The casting compound is processed at an elevated temperature to yield a preform. When appropriately heated, the casting compound has such a low viscosity and such a high capillary action that it is possible to fill out even unfavorable geometries such as casting gaps having a diameter of <200 μm in casting. The viscosity of the casting compound at 50° C. is approx. 50,000 to 160,000 mPas in the uncured state. When cast, the casting compound is exposed to a temperature of 125° C. to 160° C. to induce gelation of the casting compound. Then the temperature is raised to 160° C. to 240° C. to cure the molding. The gelation and curing times are from five minutes to six hours, depending on the temperature selected. The resulting casting compounds have the following general profile of properties after curing:

| linear shrinkage: | 0.5% |
| glass transition temperature: | 160 to 190° C. |
| thermal expansion coefficient: | 15 to 20 · $10^{-6}$ 1/° C. |
| thermal conductivity: | 3 to 3.5 W/m · K |
| insulation resistance: | >1 · $10^{12}$ Ω |

Exemplary embodiments of casting compounds and their compositions and resulting properties in the cured state are given below as examples.

|  | Exemplary embodiment 1 | Parts by weight | Exemplary embodiment 2 | Parts by weight |
| --- | --- | --- | --- | --- |
| Resin | Cycloaliphatic EP resin | 88 | Cycloaliphatic EP resin | 81 |
| Modification | Emulsion of cycloaliphatic EP resin with elastomer silicone particles | 12 | Emulsion of cycloaliphatic EP resin with elastomer silicone particles | 19 |
| Filler 1 | SiC $d_{50}$ = 161 μm | 187 | SiC $d_{50}$ = 283 μm | 235 |
| Filler 2 | $Al_2O_3$ $d_{50}$ = 7 μm | 210 | $Al_2O_3$ $d_{50}$ = 7 μm | 193 |
| Filler 3 | $Al_2O_3$ $d_{50}$ = 2.6 μm | 70 | $Al_2O_3$ $d_{50}$ = 2.6 μm | 74 |

The compositions are given in parts by weight, and the initiator is added in very low concentrations of 0.1 to 5 wt %. The compositions given above yield the following profile of properties:

|  | Exemplary embodiment 1 | Exemplary embodiment 2 |
| --- | --- | --- |
| Viscosity 50° C. | 72,000 mPas | 150,000 mPas |
| Glass transition temperature $T_g$ | 170° C. | 180° C. |
| Thermal expansion coefficient α | $18 \cdot 10^{-6}$ 1/° C. | $17 \cdot 10^{-6}$ 1/° C. |
| Thermal conductivity | 3.0 W/mK | 3.4 W/mK |
| Insulation resistance 1000 V | $>190 \cdot 10^{12}$ Ω | $>1 \cdot 10^{12}$ Ω |

Because of its high thermal conductivity, the casting compound is suitable in particular for applications in which the electric or electronic component must undergo extreme heating and cooling during operation. Among other things, this applies to windings in generators, e.g., for electric generators in automobiles.

What is claimed is:

1. A resin-based casting compound that cures by a chemical reaction, comprising:
   an epoxy resin component;
   a silicone-containing component;
   a filler through which a thermal conductivity of the casting compound is adjustable; and
   an initiator, wherein the filler is a mixture of at least two different material components, a first one of the material components being silicon carbide, wherein:
   the casting compound has a thermal conductivity of greater than 2 W/mK,
   the silicone-containing component is a dispersion of silicone elastomer particles in an epoxy resin based on a diepoxide,
   the initiator includes a cationic cross-linking agent, and
   the cationic cross-linking agent includes at least one of a boro-iodonium compound and a quinolinium compound.

2. A method of using a resin-based casting compound that cures by a chemical reaction the casting compound including an epoxy resin component, a silicone-containing component, a filler through which a thermal conductivity of the casting compound is adjustable, and an initiator, the filler being a mixture of at least two different material components, and a first one of the material components being silicon carbide, the method comprising:
   processing the casting compound into a molding;
   heating the molding to between 125 and 160 degrees Celsius;
   curing the molding; and
   using the casting compound in a winding of a generator, wherein the casting compound has a thermal conductivity of greater than 2 W/mK.

3. The method as recited in claim 2, wherein:
   the generator includes an electric generator for a motor vehicle.

4. The casting compound as recited in claim 1, wherein:
   the silicon carbide has a particle size distribution d50 of 10 μm.

5. The casting compound as recited in claim 1, wherein:
   an oxide of a main group element is used as another one of the material components.

6. The casting compound as recited in claim 5, wherein:
   the oxide of the main group element is aluminum oxide having a particle size distribution d 50 of 0.1–100 μm.

7. The casting compound as recited in claim 1, wherein:
   the filler is present in the casting compound in the amount of 60 to 95 wt%.

8. The casting compound as recited in claim 1, wherein:
   the epoxy resin component is an epoxy resin based on one of a diepoxide and a triepoxide.

9. The casting compound as recited in claim 1, wherein:
   the epoxy resin component is an epoxy resin based on a cycloaliphatic diepoxide.

10. The casting compound as recited in claim 1, wherein:
    the silicone-containing component is a dispersion of silicone elastomer particles in an epoxy resin based on a diepoxide.

11. The casting compound as recited in claim 10, wherein:
    the silicone elastomer particles have a particle diameter of 10 nm to 100 μm.

12. The casting compound as recited in claim 10, wherein:
    the initiator includes a cationic cross-linking agent.

* * * * *